United States Patent
Tewari et al.

(10) Patent No.: US 12,423,197 B2
(45) Date of Patent: Sep. 23, 2025

(54) SYSTEM AND METHOD FOR PROTECTING SYSTEM SAFETY FROM GUEST VIRTUAL MACHINE (GVM) ORIGINATED GLOBAL SYSTEM MEMORY MANAGEMENT UNIT (SMMU) FAULTS IN AUTOMOTIVE HOSTED HYPERVISOR SYSTEMS

(71) Applicant: QUALCOMM Incorporated, San Diego, CA (US)

(72) Inventors: Piyush Tewari, Uttar Pradesh (IN); Ananda Kishore Parasa, Telangana (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/607,643

(22) Filed: Mar. 18, 2024

(65) Prior Publication Data
US 2024/0330131 A1 Oct. 3, 2024

Related U.S. Application Data

(60) Provisional application No. 63/492,596, filed on Mar. 28, 2023.

(51) Int. Cl.
*G06F 11/00* (2006.01)
*G06F 11/07* (2006.01)
*G06F 11/14* (2006.01)

(52) U.S. Cl.
CPC ...... *G06F 11/1484* (2013.01); *G06F 11/0793* (2013.01); *G06F 11/1438* (2013.01)

(58) Field of Classification Search
CPC ............. G06F 11/1484; G06F 11/0793; G06F 11/1438
See application file for complete search history.

(56) References Cited

U.S. PATENT DOCUMENTS

| | | | |
|---|---|---|---|
| 2011/0066879 A1* | 3/2011 | Nakai | G06F 8/63 718/1 |
| 2016/0139950 A1* | 5/2016 | Snyder, II | G06F 9/5011 718/103 |
| 2021/0157651 A1* | 5/2021 | Duluk, Jr. | G06T 1/20 |

FOREIGN PATENT DOCUMENTS

GB 2536199 A 9/2016

OTHER PUBLICATIONS

Anonymous: "ARM System Memory Management Unit Architecture Specification, SMMU Architecture Version 3.0 and Version 3.1", ARM, Jan. 1, 2016, pp. 1-443, XP055574663, US, p. 50, p. 145-p. 170, p. 248.

(Continued)

*Primary Examiner* — Jason B Bryan
(74) *Attorney, Agent, or Firm* — Smith Tempel Blaha LLC

(57) ABSTRACT

A system for global system memory management unit (SMMU) fault handling including a peripheral device having a guest virtual machine (GVM), the peripheral device configured to access a memory (DDR) through a system memory management unit (SMMU), a hosted hypervisor associated with the peripheral device, the GVM, the SMMU and the memory (DDR), where upon identification of a faulty memory transaction and a global SMMU fault being issued, the hosted hypervisor configured to identify that a stream identifier (SID) associated with the global SMMU fault is assigned to the GVM, and the hosted hypervisor configured to reset the GVM only such that a full system restart is avoided.

20 Claims, 13 Drawing Sheets

(56) References Cited

OTHER PUBLICATIONS

Anonymous: "System Memory Management Unit Architecture Specification", SMMU Architecture Version 2.0, ARM, Jun. 30, 2016, 370 Pages, XP055422283, p. 114-p. 123.
International Search Report and Written Opinion—PCT/US2024/020517—ISA/EPO—Jun. 12, 2024.
Jin X., et al., "FTXen: Making Hypervisor Resilient to Hardware Faults on Relaxed Cores", 2015 IEEE 21st International Symposium on High Performance Computer Architecture (HPCA), IEEE, Feb. 7, 2015, pp. 451-462, XP032744037, p. 451-p. 457.

\* cited by examiner

SYSTEM AND METHOD FOR PROTECTING SYSTEM SAFETY FROM GUEST VIRTUAL MACHINE (GVM) ORIGINATED GLOBAL SYSTEM MEMORY MANAGEMENT UNIT (SMMU) FAULTS IN AUTOMOTIVE HOSTED HYPERVISOR SYSTEMS

RELATED APPLICATIONS

This application claims priority to and the benefit of U.S. Provisional Patent Application No. 63/492,596, entitled "SYSTEM AND METHOD FOR PROTECTING SYSTEM SAFETY FROM GUEST VIRTUAL MACHINE (GVM) ORIGINATED GLOBAL SYSTEM MEMORY MANAGEMENT UNIT (SMMU) FAULTS IN AUTOMOTIVE HOSTED HYPERVISOR SYSTEMS" filed Mar. 28, 2023, the contents of which are hereby incorporated herein by reference in their entirety as if fully set forth below and for all applicable purposes.

FIELD

The present disclosure relates generally to electronics, and more specifically to guest virtual machine (GVM) fault tolerance in an automotive system.

BACKGROUND

Driver assistance technology continues to expand in the field of automobiles. For example, assisted driving and self-driving technology relies on a number of different sensors and processing functions to ensure safety. Ensuring safety is part of maintaining a high automotive safety integrity level (ASIL) score. In some automotive systems, a hosted hypervisor and a guest system may interact. A hosted hypervisor adds a distinct software layer on top of a host operating system and the guest operating system becomes a third software level above the hardware. For example, a hosted hypervisor (e.g., a type-2 hypervisor) may interact with one or more peripheral devices, such as, for example, communication devices that may use WiFi, Bluetooth, USB or other connectivity. In some cases, the peripheral device may have a software element that may be referred to as a guest virtual machine (GVM). A guest virtual machine may interact with the hosted hypervisor and a memory, such as a double date rate (DDR) synchronous dynamic random-access memory (SDRAM), in a system that is controlled by the hosted hypervisor. A system memory management unit (SMMU) may also control the GVMs access to the DDR memory. However, it is desirable that an anomaly related to the guest virtual machine does not impact the overall system in which the SMMU is operating. For example, any action of the GVM that may result in a global SMMU fault may cause unwanted safety concerns related to providing continual self-driving support.

Therefore, it is desirable to prevent a guest virtual machine anomaly that may a global SMMU fault from impacting system safety.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a system for global system memory management unit (SMMU) fault handling including a peripheral device having a guest virtual machine (GVM), the peripheral device configured to access a memory (DDR) through a system memory management unit (SMMU), a hosted hypervisor associated with the peripheral device, the GVM, the SMMU and the memory (DDR), where upon identification of a faulty memory transaction and a global SMMU fault being issued, the hosted hypervisor configured to identify that a stream identifier (SID) associated with the global SMMU fault is assigned to the GVM, and the hosted hypervisor configured to reset the GVM only such that a full system restart is avoided.

Another aspect of the disclosure provides a system for global system memory management unit (SMMU) fault handling including a peripheral device having a guest virtual machine (GVM), the peripheral device configured to access a memory (DDR) through a system memory management unit (SMMU), and a hosted hypervisor associated with the peripheral device, the GVM, the SMMU and the memory (DDR), where upon identification of the GVM being terminated and a global SMMU fault being issued, the hosted hypervisor is configured to clear a stage 1 SMMU translation register and upon identifying that a stream identifier (SID) associated with the global SMMU fault is assigned to the GVM that is restarting, ignore the SMMU fault and allow the GVM to restart.

Another aspect of the disclosure provides a method for global system memory management unit (SMMU) fault handling including issuing a global system memory management unit (SMMU) fault, discovering that a stream ID (SID) associated with the global SMMU fault is assigned to a guest virtual machine (GVM), and restarting the GVM only, thus avoiding a full system restart and allowing continuous cluster functionality while the GVM is restarting.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In accordance with an exemplary embodiment, a system and method to prevent guest virtual machine anomalies from causing a global fault and a system reset in a system memory management unit (SMMU) in a hosted hypervisor system is disclosed.

In an exemplary embodiment, a vehicle such as an automobile has a cluster that may contain various instruments and displays (such as, for example, displays, indicators, gauges, malfunction indicators, system warnings, etc.) that allow a driver to safely operate the vehicle. For safety reasons, it is desirable to allow an automobile cluster to maintain functionality if a system fault, such as for example, a global SMMU fault, occurs.

Figure 1:
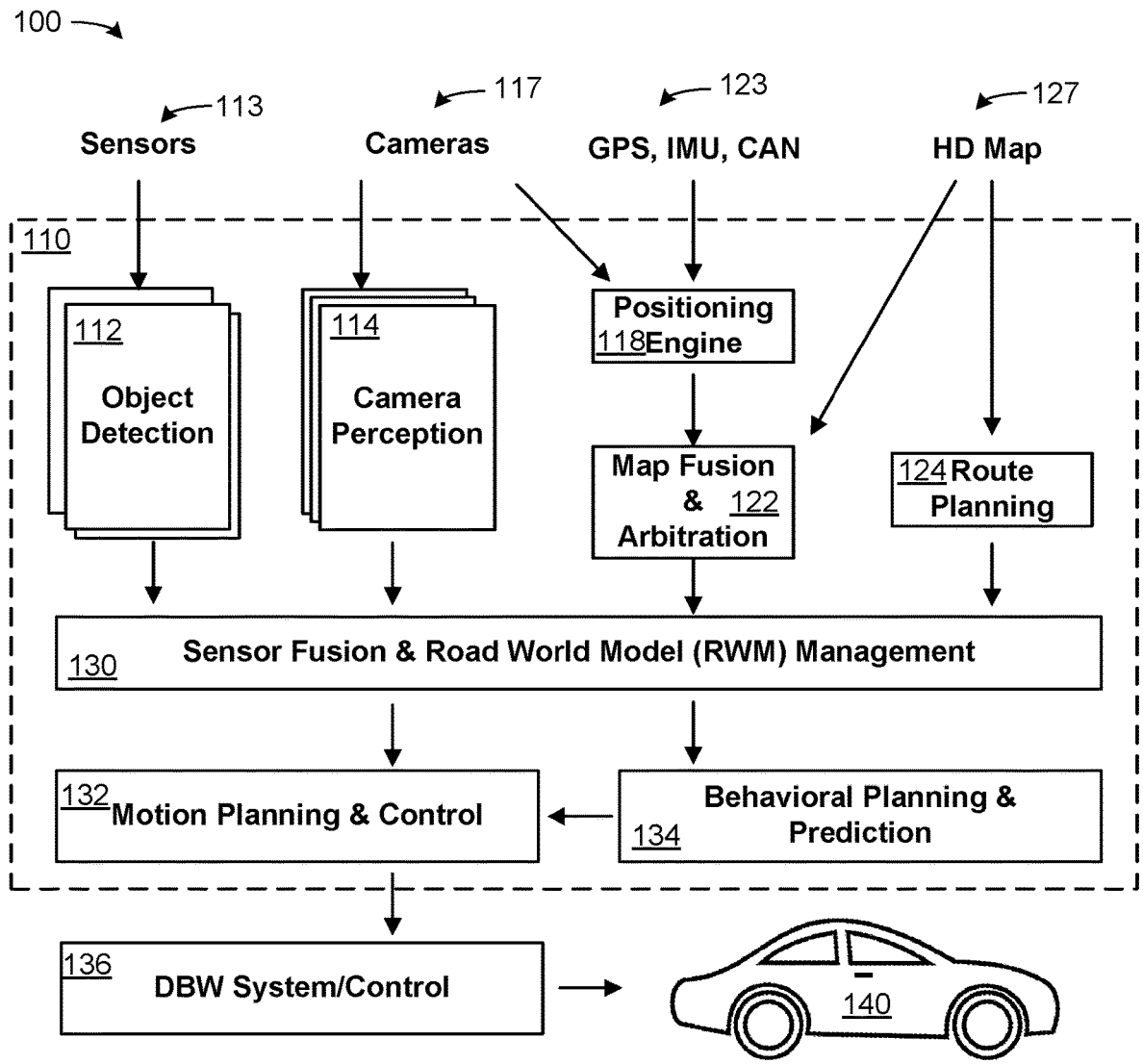
FIG. 1 is a diagram showing parts of an automotive self-driving system.

FIG. 1 is a diagram 100 showing parts of an automotive self-driving system. The automotive self-driving system may include a processing module 110, and a drive-by-wire (DBW) system controller 136. The processing module 110 may include one or more object detection elements 112 and one or more camera perception elements 114. For example, an object detection element 112 may receive inputs from one or more sensors 113; and a camera perception element 114 may receive input from one or more cameras 117.

In an exemplary embodiment, the processing module 110 also may include a positioning engine 118, a map fusion & arbitration element 122 and a route planning element 124. In an exemplary embodiment, the positioning engine 118 may receive inputs from the cameras 117 and from positioning inputs 123. The positioning inputs 123 may be, for example, global positioning system (GPS) data, inertial measurement unit (IMU) data, controller area network (CAN) data, etc. For example, the map fusion & arbitration element 122 and the route planning element 124 may receive map inputs from a high definition map element 127.

In an exemplary embodiment, the processing module 110 also may include a sensor fusion & road world model (RWM) management element 130, a motion planning & control element 132 and a behavioral planning & prediction element 134. In an exemplary embodiment, the sensor fusion & road world model (RWM) management element 130 may receive inputs from the object detection element 112, the camera perception element 114, the map fusion & arbitration element 122 and the route planning element 124 to develop a road world model. In an exemplary embodiment, a road world model may be an intelligent world model for an autonomous self-driving automobile.

In an exemplary embodiment, the sensor fusion & road world model (RWM) management element 130 may provide outputs to the motion planning & control element 132 and the behavioral planning & prediction element 134. The behavioral planning & prediction element 134 may also provide an output to the motion planning & control element 132. An output of the processing module 110 may be provided to the drive-by-wire (DBW) system controller 136, which may provide self-driving instructions to an automobile 140.

Figure 2:
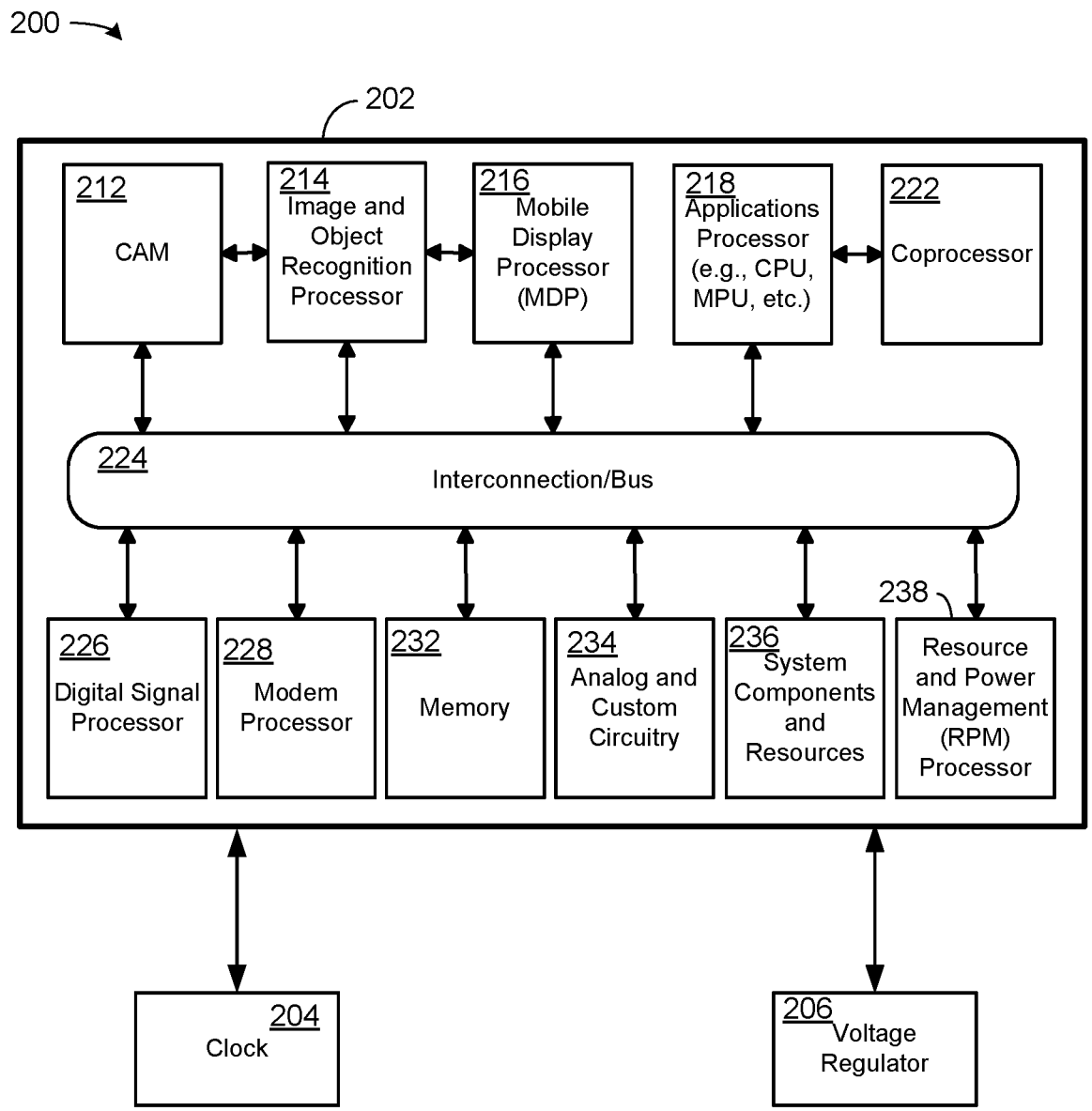
FIG. 2 is a block diagram showing a processing system.

FIG. 2 is a block diagram 200 showing a processing system. The processing system may include a processing element 202, a system clock 204 and a voltage regulator 206.

In an exemplary embodiment, the processing element 202 may include a camera 212, an image and object recognition processor 214, a mobile display processor (MDP) 216, an applications processor 218 and a coprocessor 222.

In an exemplary embodiment, the processing element 202 may include a digital signal processor (DSP) 226, a modem processor 228, a memory 232, analog and custom circuitry 234, system components and resources 236 and a resource and power management (RPN) processor 238. Each of the elements in the processing element 202 except the coprocessor 222 may be connected to an interconnection bus 224. The coprocessor 222 may be connected to the applications processor 218.

In an exemplary embodiment, the camera 212, the image and object recognition processor 214, and the mobile display processor (MDP) 216 may cooperate to provide a visual display to an operator of the automobile 140 (FIG. 1).

In an exemplary embodiment, the applications processor 218 and the coprocessor 222 may divide the processing tasks for the processing element 202.

In an exemplary embodiment, the DSP 226 may perform processing on digital signals, and the model processor may control communications for the processing element 202. The memory 232 may be static memory, dynamic memory, and may be a combination of persistent and non-persistent memory. Although shown as a single element, the memory 232 may also be distributed memory.

In an exemplary embodiment, the analog and custom circuitry 234 may provide analog signal processing, the system components and resources 236 may provide various signal processing and signal conditioning circuitry including, for example, voltage regulators, oscillators, phase-locked loops, peripheral memory controllers, memory controllers, system controllers, access ports, timers, and other components used to support processors and software clients, and the resource and power management (RPN) processor 238 controls resource power management.

The clock 204 may provide a system clock to the processing element 202 and the voltage regulator 206 may provide a regulated system voltage to the processing element 202.

Figure 3:
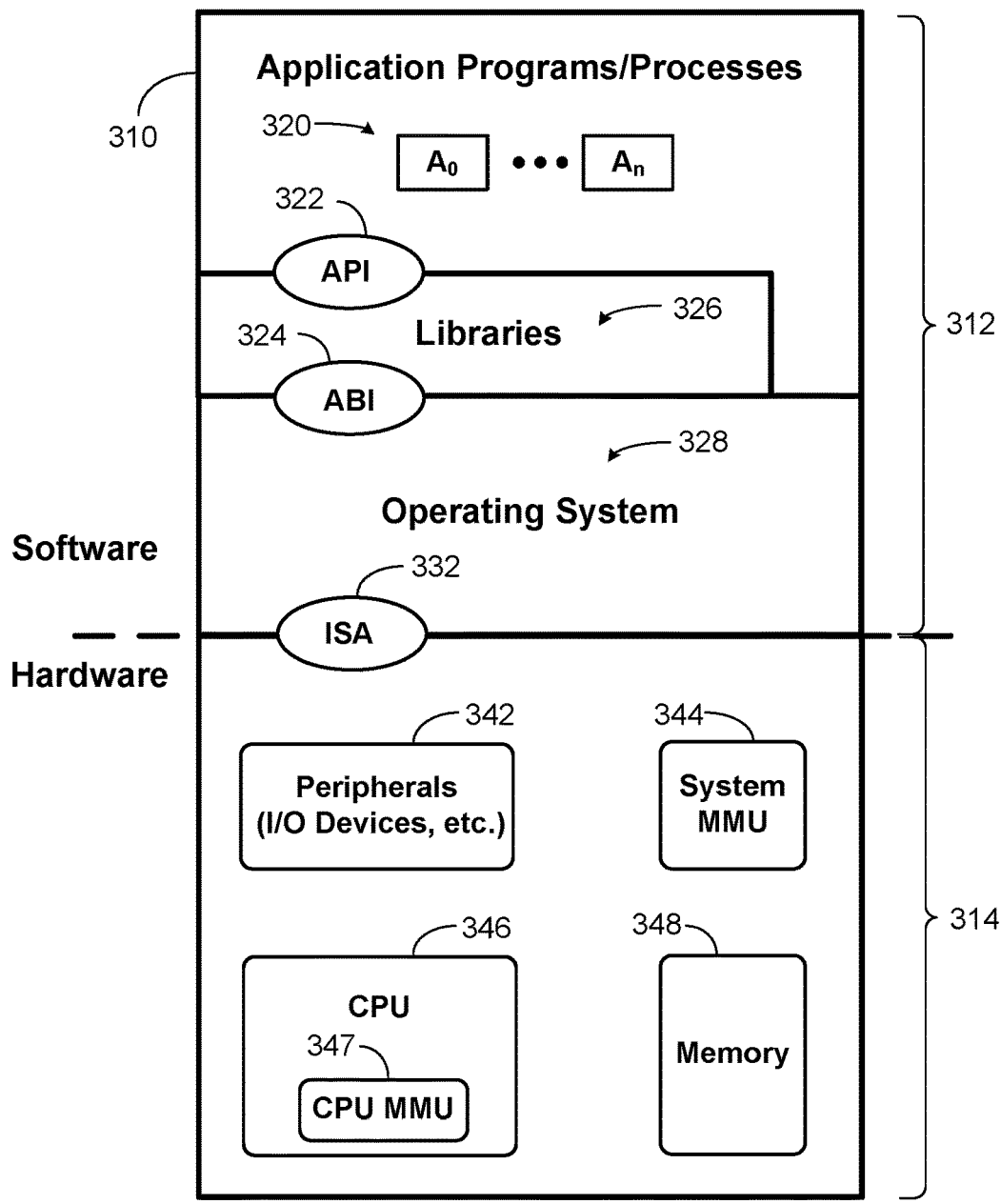
FIG. 3 is a block diagram showing part of the processing system of FIG. 2.

FIG. 3 is a block diagram 300 showing parts of the processing system of FIG. 2. In an exemplary embodiment, an application programs/processes element 310 may include aspects of the applications processor 218 of FIG. 2.

In an exemplary embodiment, the application programs/processes element 310 may comprise a software portion 312 and a hardware portion 314. In an exemplary embodiment, the software portion 312 may comprise applications 320, an application programming interface (API) 322, an application binary interface (ABI) 324, libraries 326 and an operating system (OS) 328. In an exemplary embodiment, the API 322 defines a source interface and is expressed in source code. The ABI 324 defines a low-level binary interface between two or more pieces of software on a particular architecture and is expressed in compiled code instead of source code.

In an exemplary embodiment, the hardware portion 314 may include peripheral devices 342, a system memory management unit (SMMU) 344, a CPU 346, a CPU MMU 347 (CPU for the memory management unit), and memory 348. In an exemplary embodiment, the memory 348 may comprise a double data rate (DDR) synchronous dynamic random access memory (SDRAM), referred to generally as DDR. In an exemplary embodiment, the memory 348 may be shared among multiple processes, such as multiple instances of the CPU 346 and by multiple peripheral devices 342.

An industry standard architecture (ISA) 332 may define the boundary between the software portion 312 and the hardware portion 314.

Figure 4:
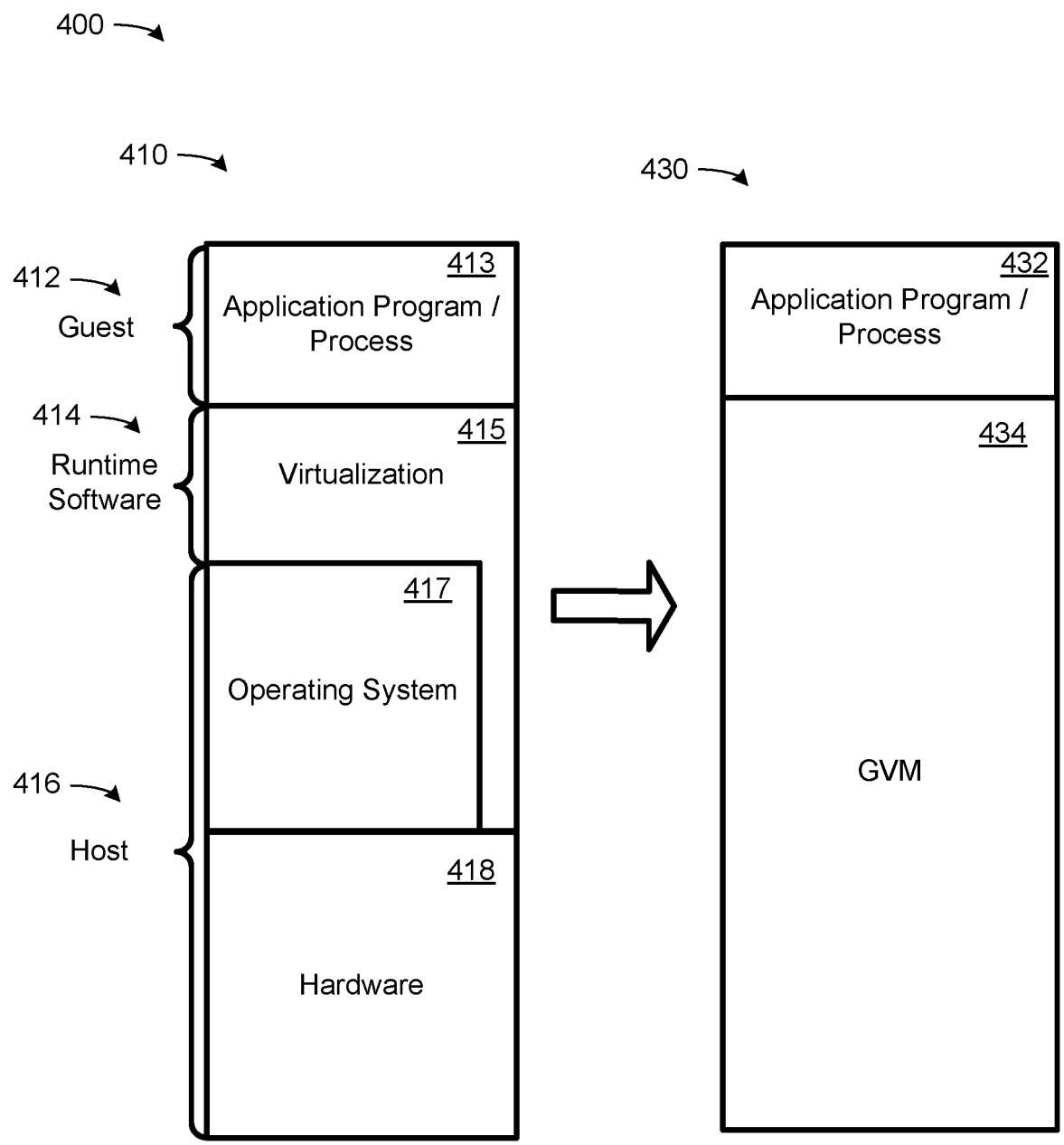
FIG. 4 is a diagram showing a computer system and related execution environment.

FIG. 4 is a diagram 400 showing a computer system and related execution environment. In an exemplary embodiment, a computer system 410 may comprise a guest module 412 having an application program/process module 413, and a runtime software module 414 that includes part of a virtualization module 415. A host module 416 includes an operating system 417, part of the virtualization module 415 and hardware 418. In an exemplary embodiment, the virtualization module 415 allows hardware resources to be divided into multiple virtual machines.

In an exemplary embodiment, a guest computer system 430 may comprise an application program/process module 432 that is also part of the guest module 412 and a guest virtual machine (GVM) 434. In an exemplary embodiment, the GVM is the software component of a virtual machine (VM).

Figure 5:
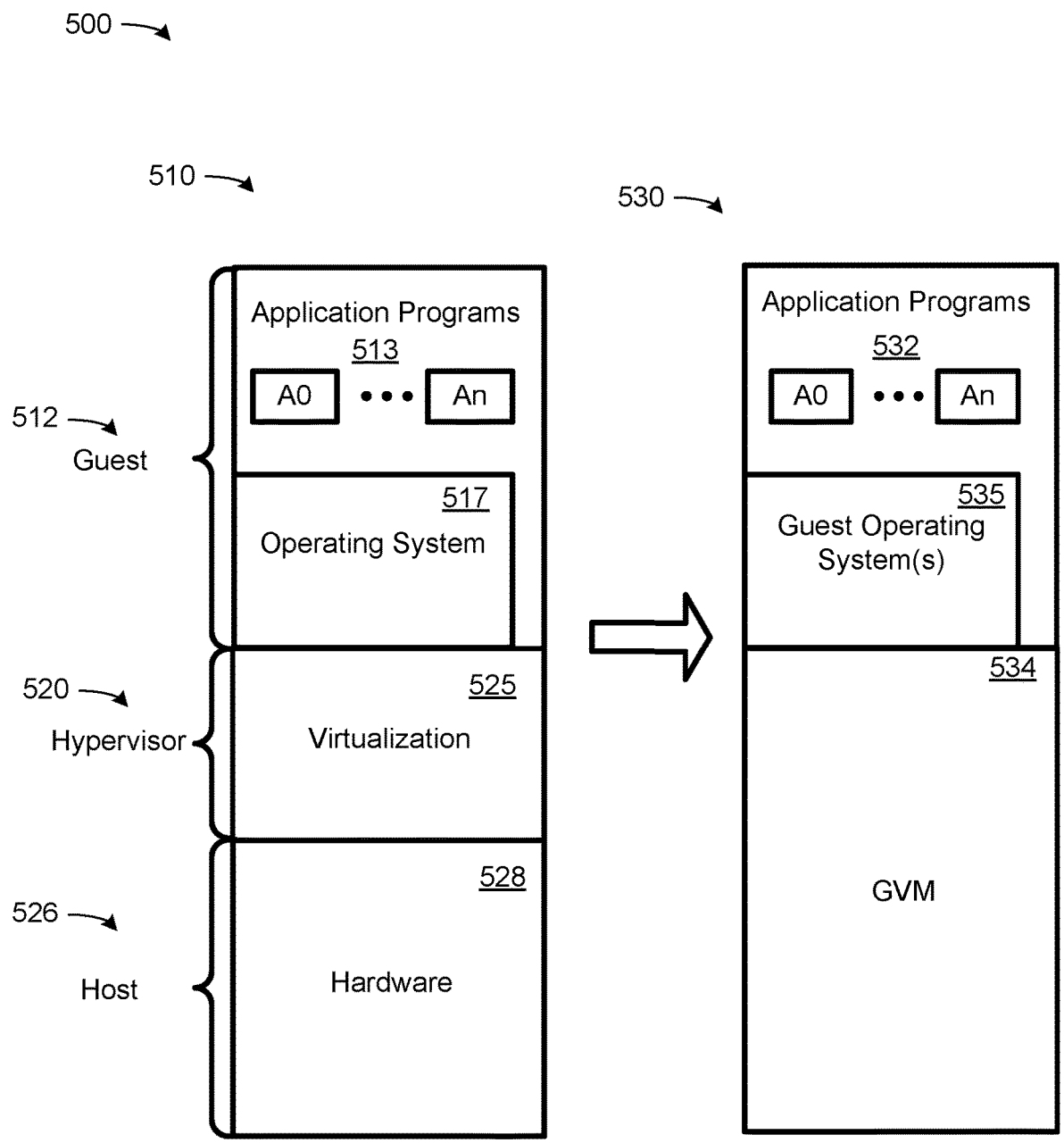
FIG. 5 is a diagram showing a computer system and related execution environment.

FIG. 5 is a diagram 500 showing a computer system and related execution environment. In an exemplary embodiment, a computer system 510 may comprise a guest module 512 having an application program/process module 513 and an operating system 517. In an exemplary embodiment, the computer system 510 also includes a hosted hypervisor 520 embodied by a virtualization module 525. A host module 526 may include hardware 528 and may run a host operating system (OS) not shown. In some embodiments, the hosted hypervisor 520 and the host module 526 may be combined in the same module. In an exemplary embodiment, a hosted hypervisor 520 will run the host OS and will perform the tasks associated with a hypervisor.

In an exemplary embodiment, a guest computer system 530 may comprise an application program/process module 532 that is also part of the guest module 512. A guest operating system module 535 may also be part of the guest module 512. A guest virtual machine (GVM) 534 may be part of the hosted hypervisor 520 and the host module 526.

Figure 6:
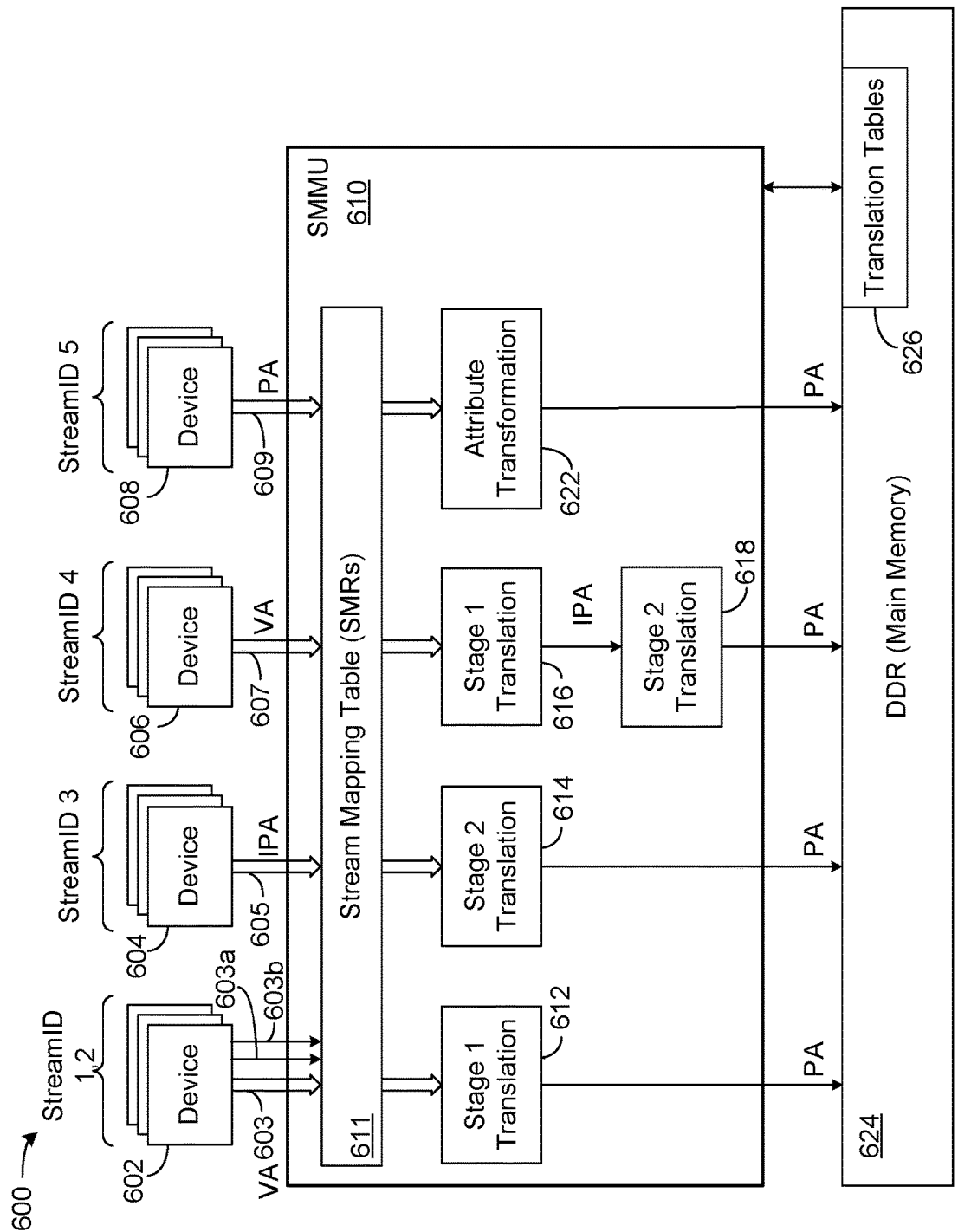
FIG. 6 is a diagram showing a system memory management unit (SMMU).

FIG. 6 is a diagram 600 showing a system memory management unit (SMMU). In an exemplary embodiment, a SMMU 610 may be connected to one or more devices. For example, peripheral devices 602, 604, 606 and 608 may be connected to the SMMU 610. The peripheral devices 602, 604, 606 and 608 may be peripheral devices that may be connected to and operating on a computing system with which the SMMU 610 is also connected. Examples of peripheral devices include, but are not limited to, devices that may connect to the SMMU 610 over a universal serial bus (USB) connection, a WiFi device, a Bluetooth device, or other devices.

In an exemplary embodiment, communication from the peripheral devices to the SMMU 610 occurs over communication streams, such as for example, communication stream 603 (or multiple communication streams 603a and 603b) that may correspond to peripheral device 602, communication stream 605 that may correspond to peripheral device 604, communication stream 607 that may correspond to peripheral device 606 and communication stream 609 that may correspond to peripheral device 608. For example, each peripheral device includes one or more stream identifiers (stream ID). For example, the peripheral device 602 has stream ID 1 and stream ID2, the peripheral device 604 has stream ID 3, the peripheral device 606 includes stream ID 4 and the peripheral device 608 includes stream ID 5. In some embodiments, a peripheral device may have multiple communication streams, where each communication stream may be assigned a unique stream ID and each stream ID may be independently assigned to the hosted hypervisor 520 and to a GVM. For example, the peripheral device 602 (or any other peripheral device) may be assigned to a hosted hypervisor and to a GVM such that the communication stream 603 may comprise unique communication streams 603a and 603b, for example, where communication stream 603a may have a stream ID (stream ID1 for example) assigned to a hosted hypervisor 520 and communication stream 603b may have a stream ID (stream ID2 for example) assigned to a GVM 534.

In an exemplary embodiment, the SMMU 610 includes a stream mapping table 611 that includes stream mapping registers (SMRs), and translation registers. For example, the SMMU 610 may include a stream mapping table 611, stage 1 translation registers 612, stage 2 translation registers 614, stage 1 translation registers 616, stage 2 translation registers 618 and attribute transformation registers 622.

In an exemplary embodiment, the stream mapping table 611 may receive the data streams from the peripheral devices 602, 604, 606 and 608 and may map the stream ID 1, stream ID 2, stream ID 3 and stream ID 4 to the various translation registers 612, 614 and 616 and to the attribute transformation registers 622.

In an exemplary embodiment, a guest virtual machine (not shown in FIG. 6) may configure the stage 1 translation registers (e.g., 612 and 616) for the peripheral devices 602 and 606 in this example. In an exemplary embodiment, the stage 1 translation register 612 may translate a virtual address (VA) from the peripheral device 602 to a physical address (PA) in the main memory 624.

In an exemplary embodiment, the stage 2 translation register 614 may translate an intermediate physical address (IPA) from the peripheral device 604 to a physical address (PA) in the main memory 624.

In an exemplary embodiment, the stage 1 translation register 616 may translate a virtual address (VA) from the peripheral device 606 to an intermediate physical address (IPA) and the stage 2 translation register 618 may translate the intermediate physical address (IPA) from the stage 1 translation register 616 to a physical address (PA) in the main memory 624.

In an exemplary embodiment, the attribute transformation register 622 may translate a physical address (PA) from the peripheral device 608 to a physical address (PA) in the main memory 624.

In an exemplary embodiment, the outputs of the translation registers 612, 614, 618 and the attribute transformation registers 622 is provided to a system memory 624. In an exemplary embodiment, the system memory 624 may comprise DDR SDRAM. The system memory 626 also includes translation tables 626. The translation tables 626 contain data structures that are used to translate from one address to another address, such as from a VA to an IPA or from an IPA to PA. When data in memory is accessed, the system looks up the physical memory address that matches the virtual address.

Figure 7:
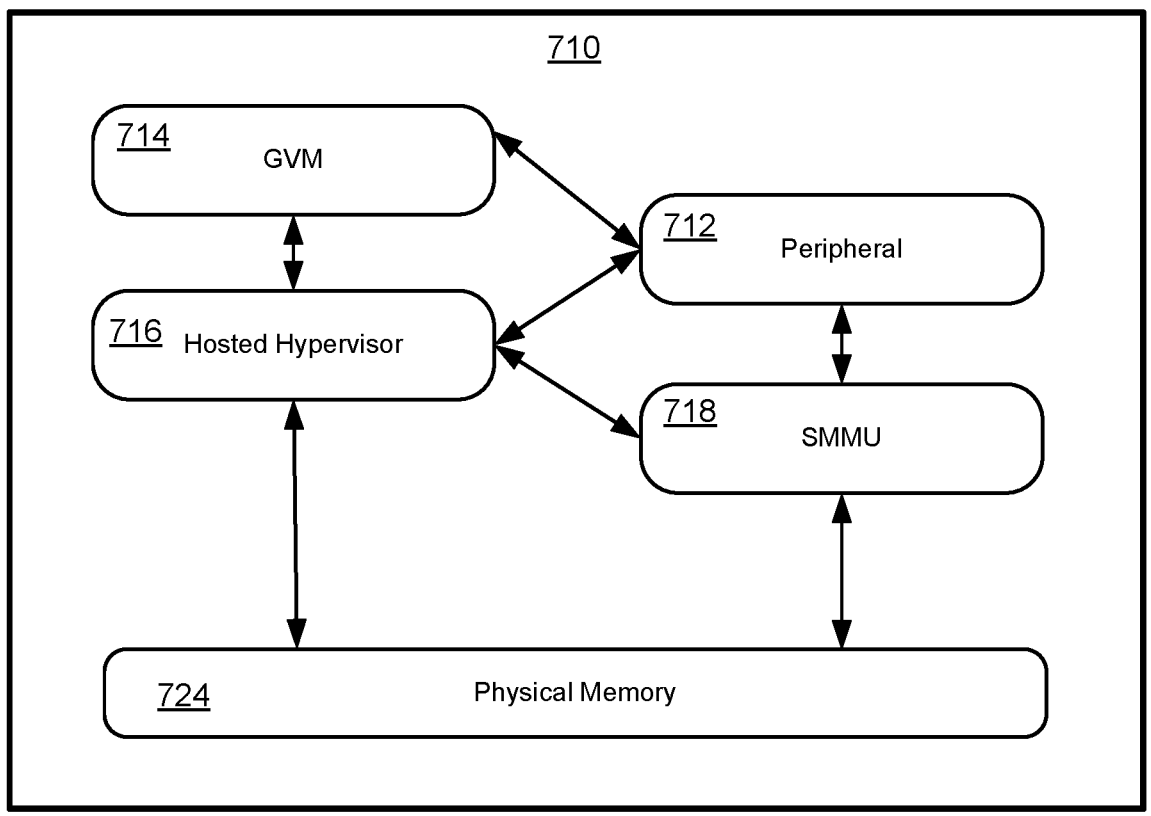
FIG. 7 is a diagram showing an example of a computing system.

FIG. 7 is a diagram 700 showing an example of a computing system 710. In an exemplary embodiment, the computing system 710 may include a peripheral device 712, a GVM 714, a hosted hypervisor 716, a SMMU 718 and a physical memory 724. In an exemplary embodiment, the physical memory 724 may be an example of DDR SDRAM. In an exemplary embodiment, the peripheral device 712 may be an example of a peripheral device 602, 604, 606 or 608 of FIG. 6; the GVM 714 may be an example of the GVM 534 of FIG. 5 (or the GVMs shown in FIG. 6); the hosted hypervisor 716 may be an example of the hosted hypervisor 520 of FIG. 5; the SMMU 718 may be an example of the SMMU 610 of FIG. 6; and the physical memory 724 may be an example of the DDR SRAM 624 of FIG. 6.

Figure 8:
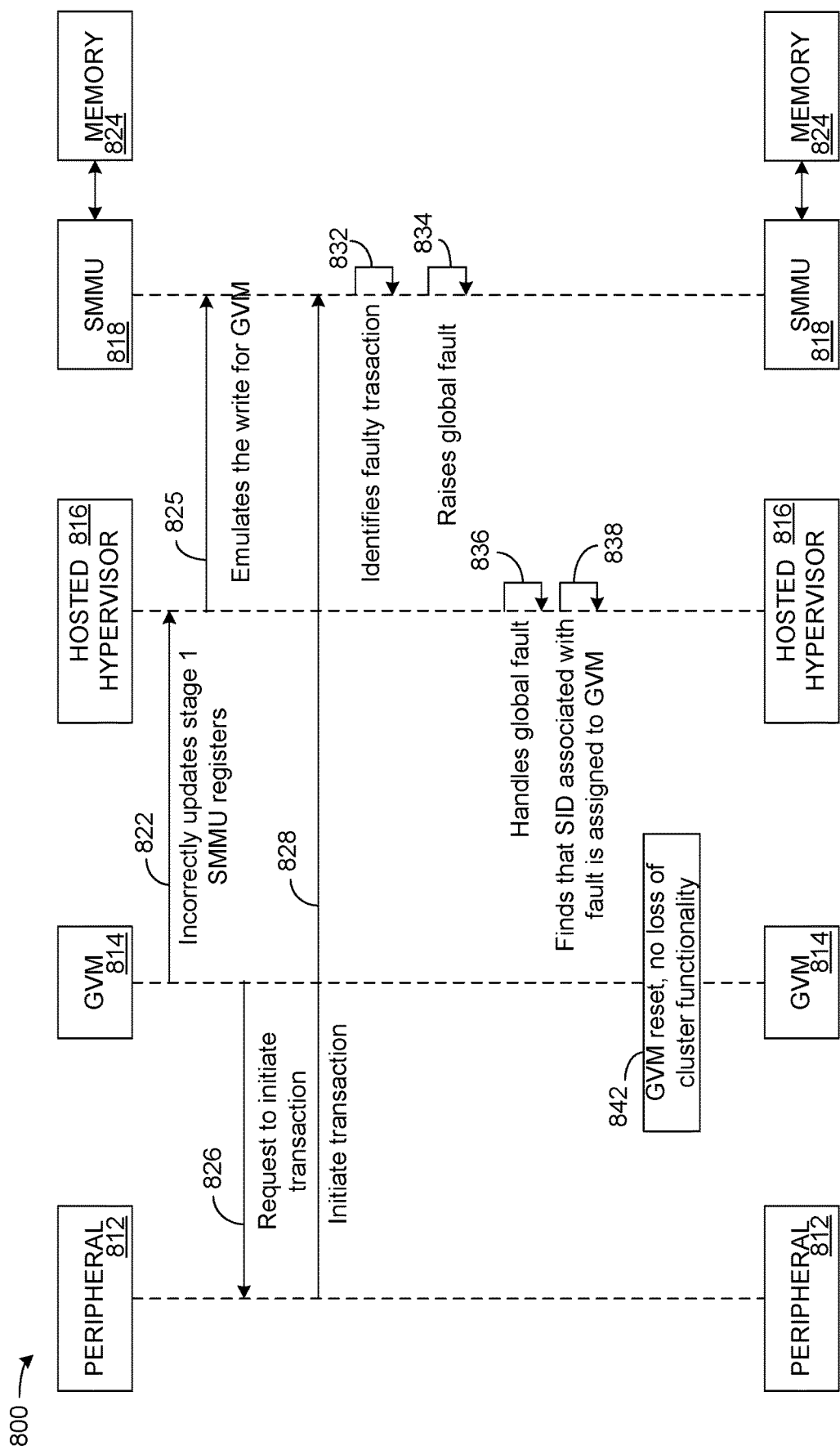
FIG. 8 is a call flow diagram in accordance with an exemplary embodiment of the disclosure.

FIG. 8 is a call flow diagram 800 in accordance with an exemplary embodiment of the disclosure. A number of different scenarios may cause a global SMMU fault. For example, an unexpected GVM restart during on-going direct memory access (DMA) operations may cause a global SMMU fault. For example, a hosted hypervisor may clear the SMMU stage 1 translation registers assigned to the GVM when the GVM is restarted. If a GVM is abruptly deactivated during a DMA transaction initiated by a peripheral device assigned to that GVM, it can cause a global SMMU fault because the SMMU would recognize an unidentified communication stream. In some instances such a global SMMU fault can be avoided if the peripheral device is powered down by the hosted hypervisor during GVM restart, but there are cases where the peripheral device cannot be turned off (for example, if the peripheral device is shared as a virtual device between a hosted hypervisor and a GVM or between two GVMs), during a system restart if a global SMMU fault is issued. In some embodiments, a peripheral device may have multiple communication streams, where each stream may be assigned a unique stream ID and each stream ID may be independently assigned to the hosted hypervisor and to a GVM, as mentioned above.

As another example, a compromised GVM may invoke a global SMMU fault to cause a system level restart.

As another example, an improper transaction from a GVM peripheral device which is incorrectly configured may cause an unidentified stream fault. This unidentified stream fault may cause a global SMMU fault, where the peripheral device stream ID (SID) is not configured in any of the stream mapping registers (SMRs) (stream mapping table 611 in FIG. 6) in the SMMU, for example. This may also cause a stream matching conflict if the stream ID (SID) of the peripheral device is configured in more than one SMR. Similarly, a stream matching conflict may be created if the SID of the peripheral device is configured in one of the SMR registers, but the TYPE field of the SMR register is set to fault context.

Therefore, it is desirable to have the ability to avoid a GVM initiated global SMMU fault from causing a complete system restart.

The exemplary embodiment described in the call flow diagram 800 describes global SMMU fault handling so that a GVM reset does not automatically result in a complete system level restart. For example, a system level restart caused by a GVM initiated SMMU global fault can cause a major safety breach because a system level reset may be a serious safety issue for an automotive self-driving system. The self-driving system has to be fully operational for the duration of the self-driving event. Therefore, it is desirable to maintain the self-driving system stability and functionality even if a global SMMU fault is detected.

In an exemplary embodiment, the call flow diagram 800 shows a peripheral device 812, a GVM 814, a hosted hypervisor 816, a SMMU 818, and a physical memory 824 in operative communication. In an exemplary embodiment, the peripheral device 812 may be an example of the peripheral device 712 of FIG. 7, the GVM 814 may be an example of the GVM 714 of FIG. 7, the hosted hypervisor 816 may be an example of the hosted hypervisor 716 of FIG. 7, the SMMU 818 may be an example of the SMMU 718 of FIG. 7, and the memory 824 may be an example of the physical memory 724 of FIG. 7.

In a call 822, in an exemplary embodiment, the GVM 814 incorrectly updates the associated stage 1 registers of the SMMU 818.

In call 825, the hosted hypervisor 816 emulates the write for the GVM 814 to the SMMU 818.

In call 826, the GVM 814 requests to initiate a transaction with the peripheral device 812. Initiating a transaction refers to reading or writing from the DDR (physical memory) via a direct memory access (DMA) mode. The transaction goes through the SMMU 818 and then to the physical memory 824.

In call 828, the peripheral device 812 initiates the transaction to access the physical memory 824 via the SMMU 818.

In call 832, the SMMU 818 identifies a faulty transaction. The faulty transaction may be a result of the incorrectly updated stage 1 SMMU registers in call 822.

In call 834, the SMMU raises a global fault. For example, the SMMU 818 may raise a global fault due to the faulty transaction in call 832.

In call 836, the hosted hypervisor 816 handles the global fault. For example, in call 838, the hosted hypervisor 816 discovers that the stream ID (SID) associated with the global SMMU fault is assigned to the GVM 814.

In call 842 only the GVM is reset, resulting in continuous (e.g., no loss of) cluster (system) functionality. For example, the hosted hypervisor 816 maintains a database of SIDs assigned to both the GVM 814 and the hosted hypervisor 816. During the handling of the global SMMU fault, the hosted hypervisor 816 will search for the SID that caused the global fault and will then restart the GVM 814 if the SID is assigned to that GVM, thus restarting only the GVM 814 and avoiding a system level restart.

If the global fault is caused by an SID assigned to the host or the SID is not found in the database, the hosted hypervisor 816 continues with default behavior of system level reset because the global SMMU fault was not triggered by the GVM 814.

Figure 9:
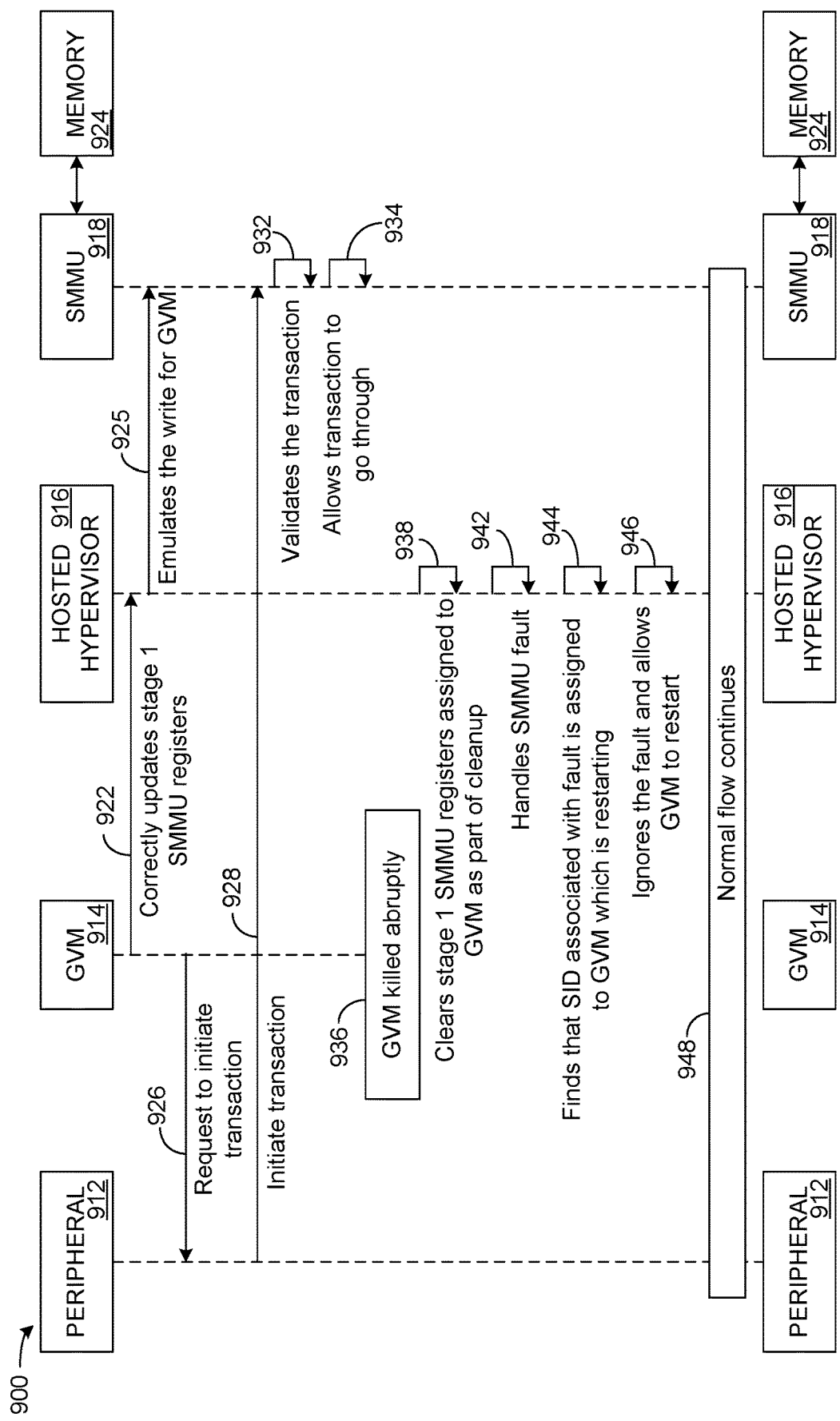
FIG. 9 is a call flow diagram in accordance with an exemplary embodiment of the disclosure.

FIG. 9 is a call flow diagram 900 in accordance with an exemplary embodiment of the disclosure.

The exemplary embodiment described in the call flow diagram 900 describes global SMMU fault handling during an abrupt termination of the GVM during a direct memory access (DMA) transaction.

In an exemplary embodiment, the call flow diagram 900 shows a peripheral device 912, a GVM 914, a hosted hypervisor 916, an SMMU 918 and a physical memory 924 in operative communication. In an exemplary embodiment, the peripheral device 912 may be an example of the peripheral device 712 of FIG. 7, the GVM 914 may be an example of the GVM 714 of FIG. 7, the hosted hypervisor 916 may be an example of the hosted hypervisor 716 of FIG. 7, the SMMU 918 may be an example of the SMMU 718 of FIG. 7, and the memory 924 may be an example of the physical memory 724 of FIG. 7.

In a call 922, in an exemplary embodiment, the GVM 914 correctly updates the associated stage 1 registers of the SMMU 918.

In call 925, the hosted hypervisor 916 emulates the write for the GVM 914 to the SMMU 918.

In call 926, the GVM 914 requests to initiate a transaction with the peripheral device 912. Initiating a transaction refers to reading or writing from the physical memory 924 (DDR) via a direct memory access (DMA) mode. The transaction goes through the SMMU 918 and then to the physical memory 924.

In block 928, the peripheral device 912 initiates the transaction to access the physical memory 924 via the SMMU 918.

In call 932, the SMMU 918 validates the transaction. For example, the SMMU 918 identifies that the transaction initiated by the peripheral device 912 is an approved transaction.

In call 934, the SMMU 918 allows the transaction to go through.

In block 936, the GVM 914 is abruptly interrupted. For example, the GVM 914 may be terminated or may have suffered a fatal fault that has abruptly suspended its operation.

In call 938, the hosted hypervisor 916 clears the stage 1 translation registers assigned to the GVM 914 as part of the recovery after the abrupt termination of the GVM 914.

In call 942, the hosted hypervisor 916 handles the SMMU fault.

In call 944, the hosted hypervisor 916 determines that the SID associated with the SMMU fault is assigned to the GVM 914 that is restarting.

In call 946, the hosted hypervisor 916 ignores the global SMMU fault and allows the GVM 914 to restart.

In block 948, normal process flow continues without a system restart. In this manner, a global SMMU fault caused by an abrupt termination of the GVM 914 does not result in a complete system restart.

Figure 10:
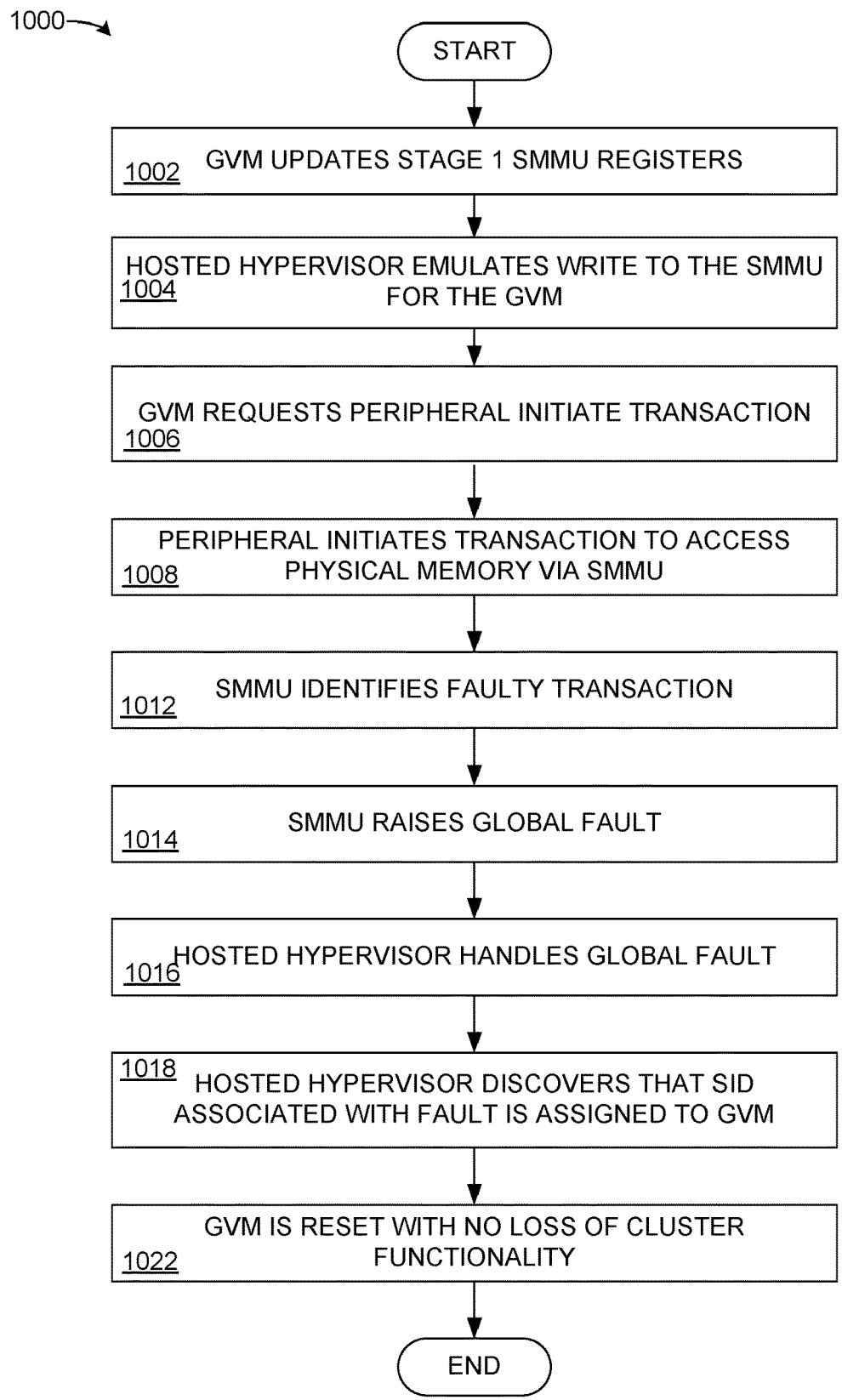
FIG. 10 is a flow chart describing an example of the operation of a method for global SMMU fault handling.

FIG. 10 is a flow chart 1000 describing an example of the operation of a method for global SMMU fault handling. The blocks in the method 1000 can be performed in or out of the order shown, and in some embodiments, can be performed at least in part in parallel.

In a block 1002, in an exemplary embodiment, a GVM updates the associated stage 1 registers of the SMMU. In an exemplary embodiment, the GVM 814 may incorrectly update the associated stage 1 translation registers 602 of the SMMU 610, 718, 818.

In block 1004, a hosted hypervisor emulates the write for a GVM to the SMMU. For example, the hosted hypervisor 816 emulates the write for the GVM 814 to the SMMU 818.

In block 1006, a GVM requests to initiate a transaction with a peripheral device. For example, the GVM 814 requests that the peripheral device 812 initiate a memory transaction.

In block 1008, a peripheral device initiates a transaction to access a physical memory via an SMMU. For example, the peripheral device 812 initiates a read or write transaction to or from the physical (DDR) memory 824 via the SMMU 818.

In block 1012, an SMMU identifies a faulty transaction. The faulty transaction may be a result of the incorrectly updated stage 1 SMMU registers in call 822. For example, the SMMU 818 identifies a faulty transaction. The faulty transaction may be a result of the incorrectly updated stage 1 SMMU registers in block 1002.

In block 1014, an SMMU raises a global fault. For example, the SMMU 818 may raise a global fault due to the faulty transaction in block 1012.

In block 1016, a hosted hypervisor handles the global fault. For example, the hosted hypervisor 818 may handle the global fault raised in block 1014.

In block 1018, the hosted hypervisor discovers that the stream ID (SID) associated with the global SMMU fault is assigned to a GVM. For example, the hosted hypervisor 816 discovers that the stream ID (SID) associated with the global SMMU fault is assigned to the GVM 814.

In block 1022 only the GVM is reset, resulting in no loss of cluster (system) functionality. For example, the hosted hypervisor 816 maintains a database of SIDs assigned to both the GVM 814 and the hosted hypervisor 816. During the handling of the global SMMU fault identified in block 1014, the hosted hypervisor 816 will search for the SID that caused the global SMMU fault and will then restart only the GVM 814 if the SID is assigned to that GVM, thus avoiding a system level restart.

If the global fault is caused by an SID assigned to the host or the SID is not found in the database, the hosted hypervisor continues with default behavior of system level reset because it was not triggered by the GVM.

Figure 11:
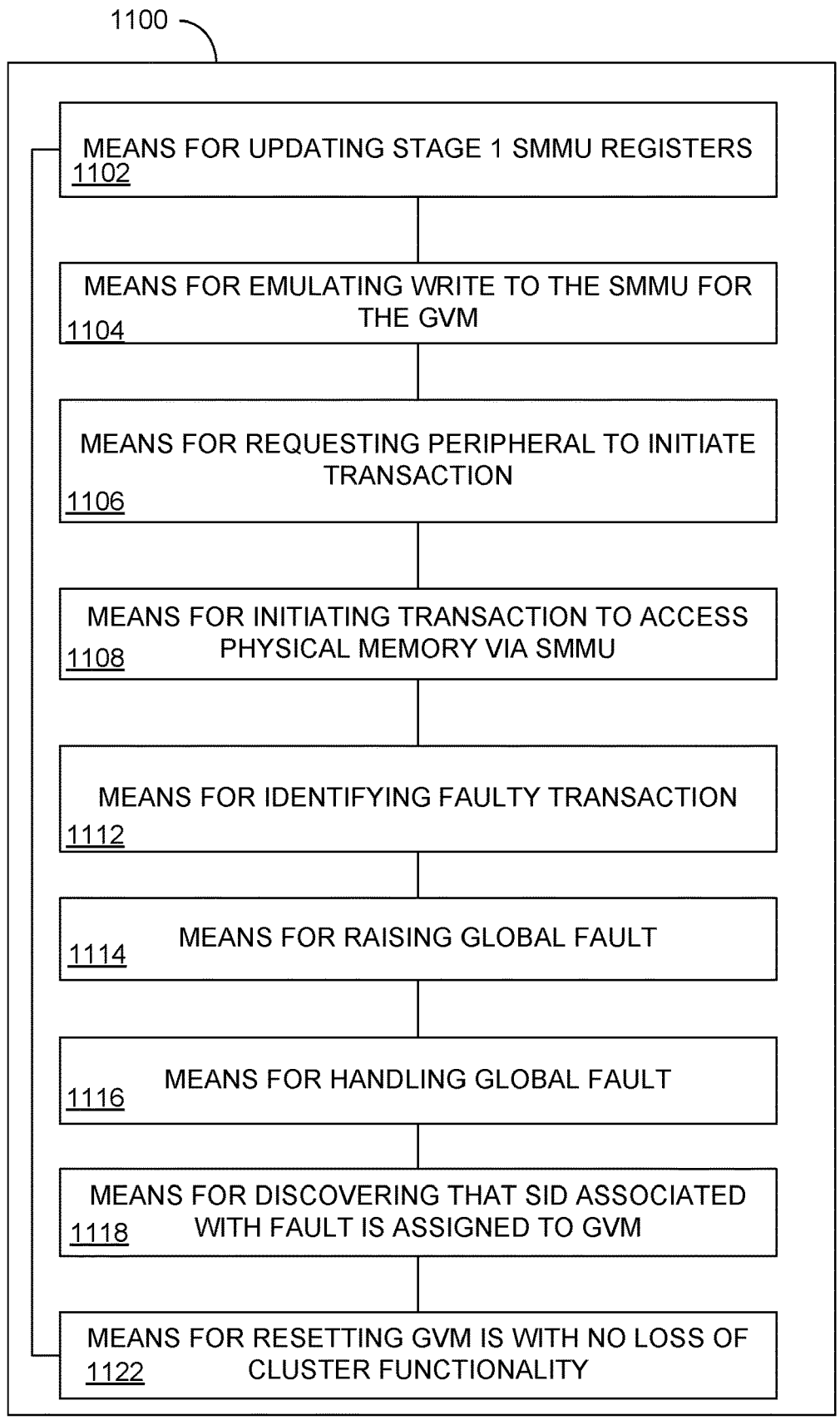
FIG. 11 is a functional block diagram of an apparatus for global SMMU fault handling.

FIG. 11 is a functional block diagram of an apparatus 1100 for global SMMU fault handling. The apparatus 1100 comprises means 1102 for updating stage 1 SMMU registers. In certain embodiments, the means 1102 for updating stage 1 SMMU registers can be configured to perform one or more of the functions described in operation block 1002 of method 1000 (FIG. 10). In an exemplary embodiment, the means 1102 for updating stage 1 SMMU registers may comprise the GVM 814 incorrectly updating the associated stage 1 translation registers 602 of the SMMU 610, 718, 818.

The apparatus 1100 may also comprise means 1104 for emulating a write to the SMMU for the GVM. In certain embodiments, the means 1104 for emulating a write to the SMMU for the GVM can be configured to perform one or more of the functions described in operation block 1004 of method 1000 (FIG. 10). In an exemplary embodiment, the means 1104 for emulating a write to the SMMU for the GVM may comprise the hosted hypervisor 816 emulating the write for the GVM 814 to the SMMU 818.

The apparatus 1100 may also comprise means 1106 for requesting that a peripheral initiate a transaction. In certain embodiments, the means 1106 for requesting that a peripheral initiate a transaction can be configured to perform one or more of the functions described in operation block 1006 of method 1000 (FIG. 10). In an exemplary embodiment, the means 1106 for requesting that a peripheral initiate a transaction may comprise the GVM 814 requesting that the peripheral device 812 initiate a memory transaction.

The apparatus 1100 may also comprise means 1108 for initiating a transaction to access a physical memory via a system memory management unit (SMMU). In certain embodiments, the means 1108 for initiating a transaction to access physical memory via a system memory management unit (SMMU) can be configured to perform one or more of the functions described in operation block 1008 of method 1000 (FIG. 10). In an exemplary embodiment, the means 1108 for initiating a transaction to access physical memory via a system memory management unit (SMMU) may comprise the peripheral device 812 initiating a transaction to access the physical memory 824 via the SMMU 818.

The apparatus 1100 may also comprise means 1112 for identifying a faulty transaction. In certain embodiments, the means 1112 for identifying a faulty transaction can be configured to perform one or more of the functions described in operation block 1012 of method 1000 (FIG. 10). In an exemplary embodiment, the means 1112 for identifying a faulty transaction may comprise the SMMU 818 identifying a faulty transaction. The faulty transaction may be a result of the GVM 814 incorrectly updating stage 1 SMMU registers.

The apparatus 1100 may also comprise means 1114 for raising a global fault. In certain embodiments, the means 1114 for raising a global fault can be configured to perform one or more of the functions described in operation block 1014 of method 1000 (FIG. 10). In an exemplary embodiment, the means 1114 for raising a global fault may comprise the SMMU 818 raising a global fault due to the faulty transaction.

The apparatus 1100 may also comprise means 1116 for handling a global fault. In certain embodiments, the means 1116 for handling a global fault can be configured to perform one or more of the functions described in operation block 1016 of method 1000 (FIG. 10). In an exemplary embodiment, the means 1116 for handling a global fault may comprise the hosted hypervisor 818 handling the global fault.

The apparatus 1100 may also comprise means 1118 for discovering that an SID associated with a global SMMU fault is assigned to a GVM. In certain embodiments, the means 1118 for discovering that an SID associated with a global SMMU fault is assigned to a GVM can be configured to perform one or more of the functions described in operation block 1018 of method 1000 (FIG. 10). In an exemplary embodiment, the means 1118 for discovering that an SID associated with a global SMMU fault is assigned to a GVM may comprise the hosted hypervisor 816 discovering that the stream ID (SID) associated with the global SMMU fault is assigned to the GVM 814.

The apparatus 1100 may also comprise means 1122 for resetting a GVM with no loss of cluster (system) functionality. In certain embodiments, the means 1122 for resetting a GVM with no loss of cluster functionality can be configured to perform one or more of the functions described in operation block 1022 of method 1000 (FIG. 10). In an exemplary embodiment, the means 1122 for resetting a GVM with no loss of cluster functionality may comprise the hosted hypervisor 816 searching for the SID that caused the global SMMU fault and then restarting only the GVM 814 if the SID is assigned to that GVM, thus avoiding a system level restart.

Figure 12:
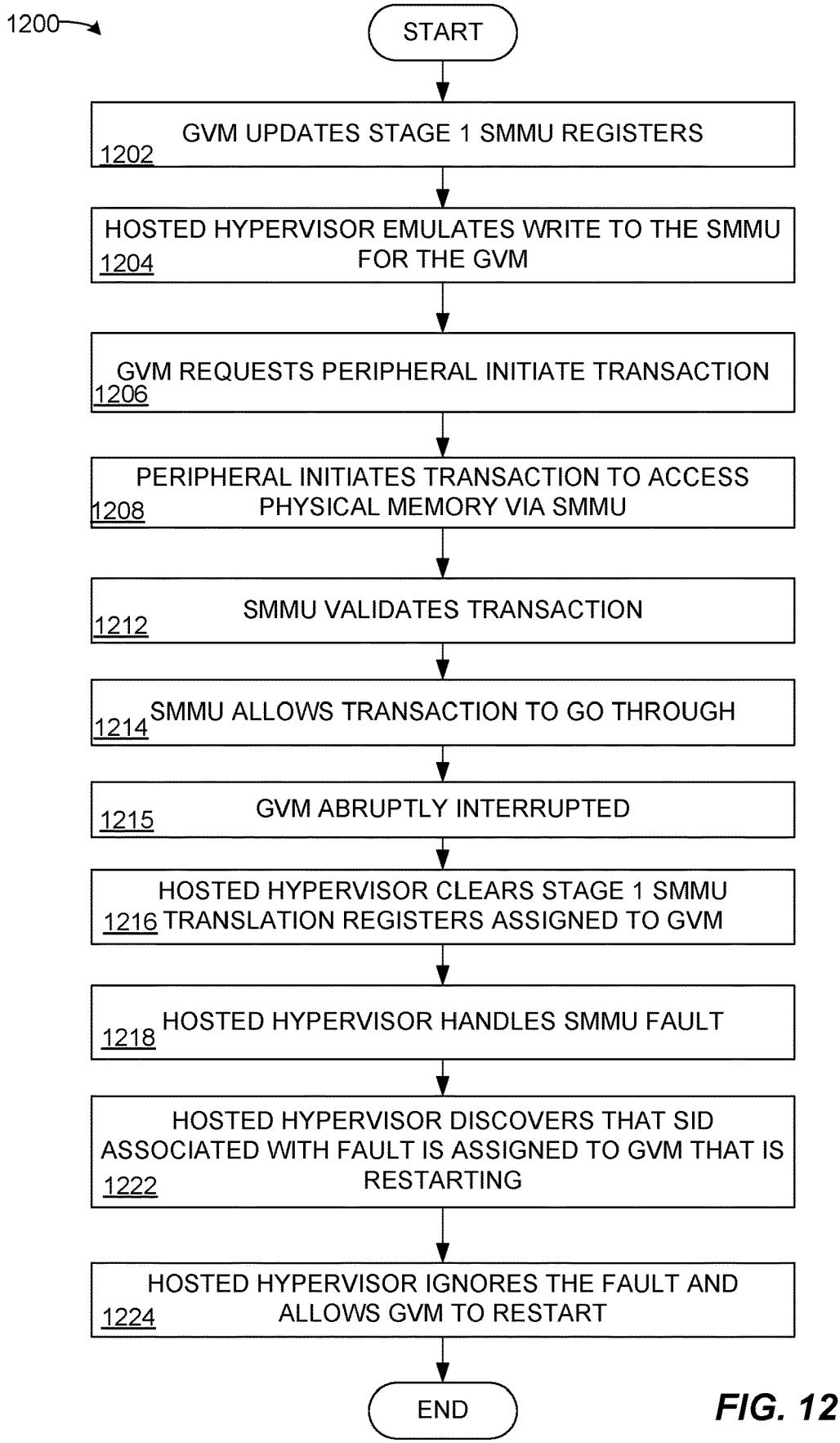
FIG. 12 is a flow chart describing an example of the operation of a method for global SMMU fault handling.

FIG. 12 is a flow chart 1200 describing an example of the operation of a method for global SMMU fault handling. The blocks in the method 1200 can be performed in or out of the order shown, and in some embodiments, can be performed at least in part in parallel.

In a block 1202, in an exemplary embodiment, a GVM updates the associated stage 1 registers of the SMMU. In an exemplary embodiment, the GVM 814 may correctly update the associated stage 1 translation registers 602 of the SMMU 610, 718, 918.

In block 1204, a hosted hypervisor emulates the write for a GVM to the SMMU. For example, the hosted hypervisor 916 emulates the write for the GVM 914 to the SMMU 918.

In block 1206, a GVM requests to initiate a transaction with a peripheral device. For example, the GVM 914 requests that the peripheral device 912 initiate a memory transaction.

In block 1208, a peripheral device initiates a transaction to access physical memory via an SMMU. For example, the peripheral device 912 initiates the transaction to access the physical memory 924 via the SMMU 918.

In block 1212, an SMMU validates the transaction. For example, the SMMU 918 validates the transaction initiated by the peripheral device 912.

In block 1214, an SMMU allows the transaction to go through. For example, the SMMU 918 may allow the transaction initiated by the peripheral device 912 to go through.

In block 1215, a GVM is abruptly interrupted. For example, the operation of the GVM 914 may be terminated or the GVM 914 may have suffered a fatal fault that suspended its operation.

In block 1216, a hosted hypervisor clears the stage 1 translation registers in an SMMU that are assigned to the GVM. For example, the hosted hypervisor 916 clears the stage 1 SMMU translation registers 602 assigned to the GVM 914 as part of the recovery after the GVM 914 is abruptly terminated.

In block 1218, the hosted hypervisor handles the global SMMU fault. For example, the hosted hypervisor 918 may handle a global SMMU fault raised by the SMMU 918 resulting from the abrupt termination of the GVM 914.

In block 1222, the hosted hypervisor discovers that the stream ID (SID) associated with the global SMMU fault is assigned to the GVM that is restarting. For example, the hosted hypervisor 916 discovers that the stream ID (SID) associated with the global SMMU fault is assigned to the GVM 914 that is now restarting.

In block 1224, the hosted hypervisor ignores the global SMMU fault and allows the GVM to restart. For example, the hosted hypervisor 916 ignores the SMMU fault and allows the GVM 914 to restart, thus allowing normal process flow to continue without a system restart.

Figure 13:
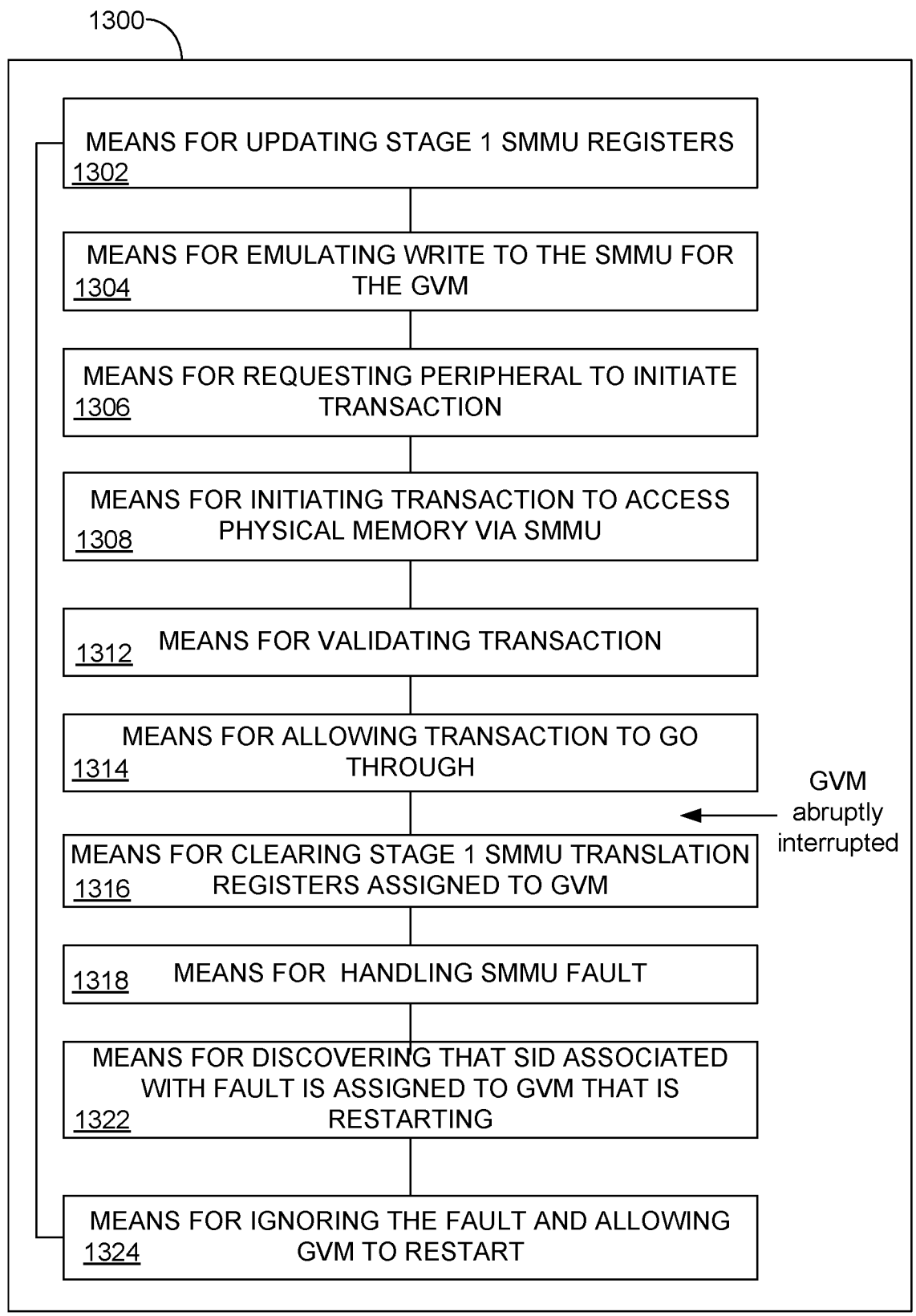
FIG. 13 is a functional block diagram of an apparatus for global SMMU fault handling.

FIG. 13 is a functional block diagram of an apparatus 1300 for global SMMU fault handling. The apparatus 1300 comprises means 1302 for updating stage 1 SMMU registers. In certain embodiments, the means 1302 for updating stage 1 SMMU registers can be configured to perform one or more of the functions described in operation block 1202 of method 1200 (FIG. 12). In an exemplary embodiment, the means 1302 for updating stage 1 SMMU registers may comprise the GVM 914 correctly updating the associated stage 1 translation registers 602 of the SMMU 610/918.

The apparatus 1300 may also comprise means 1304 for emulating a write to the SMMU for the GVM. In certain embodiments, the means 1304 for emulating a write to the SMMU for the GVM can be configured to perform one or more of the functions described in operation block 1204 of method 1200 (FIG. 12). In an exemplary embodiment, the means 1304 for emulating a write to the SMMU for the GVM may comprise the hosted hypervisor 916 emulating the write for the GVM 914 to the SMMU 918.

The apparatus 1300 may also comprise means 1306 for requesting that a peripheral initiate a transaction. In certain embodiments, the means 1306 for requesting that a peripheral initiate a transaction can be configured to perform one or more of the functions described in operation block 1206 of method 1200 (FIG. 12). In an exemplary embodiment, the means 1306 for requesting that a peripheral initiate a transaction may comprise the GVM 914 requesting that the peripheral device 912 initiate a memory transaction.

The apparatus 1300 may also comprise means 1308 for initiating a transaction to access physical memory via a system memory management unit (SMMU). In certain embodiments, the means 1308 for initiating a transaction to access physical memory via a system memory management unit (SMMU) can be configured to perform one or more of the functions described in operation block 1208 of method 1200 (FIG. 12). In an exemplary embodiment, the means 1308 for initiating a transaction to access physical memory via a system memory management unit (SMMU) may comprise the peripheral device 912 initiating a transaction to access the physical memory 924 via the SMMU 918.

The apparatus 1300 may also comprise means 1312 for validating a transaction. In certain embodiments, the means 1312 for validating a transaction can be configured to perform one or more of the functions described in operation block 1212 of method 1200 (FIG. 12). In an exemplary embodiment, the means 1312 for validating a transaction may comprise the SMMU 918 validating the transaction initiated by the peripheral device 912.

The apparatus 1300 may also comprise means 1314 for allowing a transaction to go through. In certain embodiments, the means 1314 for allowing a transaction to go through can be configured to perform one or more of the functions described in operation block 1214 of method 1200 (FIG. 12). In an exemplary embodiment, the means 1314 for allowing a transaction to go through may comprise the SMMU 918 allowing the transaction initiated by the peripheral device 912 to go through.

The apparatus 1300 may also comprise means 1316 for clearing stage 1 SMMU translation registers assigned to a GVM that is abruptly terminated. In certain embodiments, the means 1316 for clearing stage 1 SMMU translation registers assigned to a GVM that is abruptly terminated can be configured to perform one or more of the functions described in operation block 1216 of method 1200 (FIG. 12). In an exemplary embodiment, the means 1316 for clearing stage 1 SMMU translation registers assigned to a GVM that is abruptly terminated may comprise the hosted hypervisor 916 clearing the stage 1 SMMU translation registers 602 assigned to the GVM 914 as part of the recovery after the GVM 914 is abruptly terminated.

The apparatus 1300 may also comprise means 1318 for handling an SMMU fault. In certain embodiments, the means 1318 for handling an SMMU fault can be configured to perform one or more of the functions described in operation block 1218 of method 1200 (FIG. 12). In an exemplary embodiment, the means 1318 for handling an SMMU fault may comprise the hosted hypervisor 918 handling a global SMMU fault raised by the SMMU 918 resulting from the abrupt termination of the GVM 914.

The apparatus 1300 may also comprise means 1322 for discovering that the stream ID (SID) associated with the global SMMU fault is assigned to the GVM that is restarting. In certain embodiments, the means 1322 for discovering that the stream ID (SID) associated with the global SMMU fault is assigned to the GVM that is restarting can be configured to perform one or more of the functions described in operation block 1222 of method 1200 (FIG. 12). In an exemplary embodiment, the means 1322 for discovering that the stream ID (SID) associated with the global SMMU fault is assigned to the GVM that is restarting may comprise the hosted hypervisor 916 discovering that the stream ID (SID) associated with the global SMMU fault is assigned to the GVM 914 that is now restarting.

The apparatus 1300 may also comprise means 1324 for ignoring the fault and allowing the GVM to restart. In certain embodiments, the means 1324 for ignoring the fault and allowing the GVM to restart can be configured to perform one or more of the functions described in operation block 1224 of method 1200 (FIG. 12). In an exemplary embodiment, the means 1324 for ignoring the fault and allowing the GVM to restart may comprise the hosted hypervisor 916 ignoring the fault and allowing the GVM 914 to restart, thus allowing normal process flow to continue without a system restart.

Implementation examples are described in the following numbered clauses:

1. A system for global system memory management unit (SMMU) fault handling, comprising: a peripheral device having a guest virtual machine (GVM), the peripheral device configured to access a memory (DDR) through a system memory management unit (SMMU); a hosted hypervisor associated with the peripheral device, the GVM, the SMMU and the memory (DDR), where upon identification of a faulty memory transaction and a global SMMU fault being issued, the hosted hypervisor configured to identify that a stream identifier (SID) associated with the global SMMU fault is assigned to the GVM; and the hosted hypervisor configured to reset the GVM only such that a full system restart is avoided.
2. The system of clause 1, wherein the global SMMU fault is a result of the GVM incorrectly updating a stage 1 SMMU translation register.
3. The system of any of clauses 1 or 2, wherein avoiding a full system restart allows continuous cluster functionality while the GVM is reset.
4. The system of any of clauses 1 through 3, wherein the memory (DDR) is shared among multiple peripheral devices.
5. The system of clause 4, wherein the multiple peripheral devices each have a respective GVM.
6. The system of any of clauses 1 through 5, wherein the peripheral device comprises multiple communication streams.
7. The system of clause 6, wherein the multiple communication streams comprise multiple respective unique stream identifiers (SIDs) and correspond to a GVM and a hosted hypervisor.
8. A system for global system memory management unit (SMMU) fault handling, comprising: a peripheral device having a guest virtual machine (GVM), the peripheral device configured to access a memory (DDR) through a system memory management unit (SMMU); and a hosted hypervisor associated with the peripheral device, the GVM, the SMMU and the memory (DDR), where upon identification of the GVM being terminated and a global SMMU fault being issued, the hosted hypervisor is configured to clear a stage 1 SMMU translation register and upon identifying that a stream identifier (SID) associated with the global SMMU fault is assigned to the GVM that is restarting, ignore the SMMU fault and allow the GVM to restart.
9. The system of clause 8, wherein the global SMMU fault is a result of the GVM abruptly terminating.
10. The system of any of clauses 8 or 9, wherein ignoring the SMMU fault and allowing the GVM to restart avoids a full system restart and allows continuous cluster functionality while the GVM is restarting.
11. The system of any of clauses 8 through 10, wherein the memory (DDR) is shared among multiple peripheral devices.
12. The system of clause 11, wherein the multiple peripheral devices each have a respective GVM.
13. The system of any of clauses 8 through 12, wherein the peripheral device comprises multiple communication streams.

14. The system of clause 13, wherein the multiple communication streams comprise multiple respective unique stream identifiers (SIDs) and correspond to a GVM and a hosted hypervisor.

15. A method for global system memory management unit (SMMU) fault handling, comprising: issuing a global system memory management unit (SMMU) fault; discovering that a stream ID (SID) associated with the global SMMU fault is assigned to a guest virtual machine (GVM); and restarting the GVM only, thus avoiding a full system restart and allowing continuous cluster functionality while the GVM is restarting.

16. The method of clause 15, wherein the global SMMU fault is a result of a faulty memory transaction and a hosted hypervisor connected to the SMMU and to the GVM identifies that a stream identifier (SID) associated with the global SMMU fault is assigned to the GVM.

17. The method of any of clauses 15 or 16, wherein the SMMU fault is a result of the GVM being terminated and the method further comprises: the hosted hypervisor clearing a stage 1 SMMU translation register; and upon identifying that a stream identifier (SID) associated with the global SMMU fault is assigned to the GVM that is restarting, ignoring the SMMU fault and allowing the GVM to restart.

18. The method of any of clauses 15 through 17, wherein the GVM is associated with a peripheral device and multiple peripheral devices share a double data rate (DDR) memory.

19. The method of clause 18, wherein the multiple peripheral devices each have a respective GVM.

20. The method of any of clauses 15 through 19, wherein the peripheral device comprises multiple communication streams.

The circuit architecture described herein described herein may be implemented on one or more ICs, analog ICs, RFICs, mixed-signal ICs, ASICs, printed circuit boards (PCBs), electronic devices, etc. The circuit architecture described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

Although selected aspects have been illustrated and described in detail, it will be understood that various substitutions and alterations may be made therein without departing from the spirit and scope of the present invention, as defined by the following claims.

What is claimed is:

1. A system for global system memory management unit (SMMU) fault handling, comprising:
a peripheral device having a guest virtual machine (GVM), the peripheral device configured to access a memory (DDR) through a system memory management unit (SMMU);
a hosted hypervisor associated with the peripheral device, the GVM, the SMMU and the memory (DDR), where upon identification of a faulty memory transaction and a global SMMU fault being issued, the hosted hypervisor configured to identify that a stream identifier (SID) associated with the global SMMU fault is assigned to the GVM; and
the hosted hypervisor configured to reset the GVM only such that a full system restart is avoided.

2. The system of claim 1, wherein the global SMMU fault is a result of the GVM incorrectly updating a stage 1 SMMU translation register.

3. The system of claim 1, wherein avoiding a full system restart allows continuous cluster functionality while the GVM is reset.

4. The system of claim 1, wherein the memory (DDR) is shared among multiple peripheral devices.

5. The system of claim 4, wherein the multiple peripheral devices each have a respective GVM.

6. The system of claim 1, wherein the peripheral device comprises multiple communication streams.

7. The system of claim 6, wherein the multiple communication streams comprise multiple respective unique stream identifiers (SIDs) and correspond to a GVM and a hosted hypervisor.

8. A system for global system memory management unit (SMMU) fault handling, comprising:
a peripheral device having a guest virtual machine (GVM), the peripheral device configured to access a memory (DDR) through a system memory management unit (SMMU); and
a hosted hypervisor associated with the peripheral device, the GVM, the SMMU and the memory (DDR), where upon identification of the GVM being terminated and a global SMMU fault being issued, the hosted hypervisor is configured to clear a stage 1 SMMU translation register and upon identifying that a stream identifier (SID) associated with the global SMMU fault is assigned to the GVM that is restarting, ignore the global SMMU fault and allow the GVM to restart.

9. The system of claim 8, wherein the global SMMU fault is a result of the GVM abruptly terminating.

10. The system of claim 9, wherein ignoring the global SMMU fault and allowing the GVM to restart avoids a full system restart and allows continuous cluster functionality while the GVM is restarting.

11. The system of claim 8, wherein the memory (DDR) is shared among multiple peripheral devices.

12. The system of claim 11, wherein the multiple peripheral devices each have a respective GVM.

13. The system of claim 8, wherein the peripheral device comprises multiple communication streams.

14. The system of claim 13, wherein the multiple communication streams comprise multiple respective unique stream identifiers (SIDs) and correspond to a GVM and a hosted hypervisor.

15. A method for global system memory management unit (SMMU) fault handling, comprising:
issuing a global system memory management unit (SMMU) fault;
discovering that a stream ID (SID) associated with the global SMMU fault is assigned to a guest virtual machine (GVM); and restarting the GVM only, thus avoiding a full system restart and allowing continuous cluster functionality while the GVM is restarting.

16. The method of claim 15, wherein the global SMMU fault is a result of a faulty memory transaction and a hosted hypervisor connected to the SMMU and to the GVM identifies that a stream identifier (SID) associated with the global SMMU fault is assigned to the GVM.

17. The method of claim 16, wherein the global SMMU fault is a result of the GVM being terminated and the method further comprises:
   the hosted hypervisor clearing a stage 1 SMMU translation register; and
   upon identifying that a stream identifier (SID) associated with the global SMMU fault is assigned to the GVM that is restarting, ignoring the global SMMU fault and allowing the GVM to restart.

18. The method of claim 15, wherein the GVM is associated with a peripheral device and multiple peripheral devices share a double data rate memory.

19. The method of claim 18, wherein the multiple peripheral devices each have a respective GVM.

20. The method of claim 18, wherein the peripheral device comprises multiple communication streams.

* * * * *